(12) United States Patent
Sato (10) Patent No.: US 9,537,384 B2
(45) Date of Patent: Jan. 3, 2017

(54) POWER SUPPLY NOISE REDUCTION CIRCUIT AND POWER SUPPLY NOISE REDUCTION METHOD

(75) Inventor: Toshiyuki Sato, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 917 days.

(21) Appl. No.: 13/883,278

(22) PCT Filed: Nov. 12, 2010

(86) PCT No.: PCT/JP2010/006657
§ 371 (c)(1),
(2), (4) Date: Aug. 8, 2013

(87) PCT Pub. No.: WO2012/059963
PCT Pub. Date: May 10, 2012

(65) Prior Publication Data
US 2013/0308354 A1    Nov. 21, 2013

(30) Foreign Application Priority Data
Nov. 2, 2010   (JP) ................................ 2010-246763

(51) Int. Cl.
*H02M 1/14*    (2006.01)

(52) U.S. Cl.
CPC .............. *H02M 1/14* (2013.01); *H02M 1/143* (2013.01)

(58) Field of Classification Search
CPC .......... Y02E 40/20; Y02E 40/22; Y02E 40/24; Y02E 40/40; H02J 3/01; H02M 1/14; H02M 1/143; H02M 1/146; H02M 1/15

USPC ....... 363/39–48; 333/167–185; 327/551–559
See application file for complete search history.

(56) References Cited

U.S. PATENT DOCUMENTS

| 3,670,230 A | * | 6/1972 | Rooney | H02M 1/15 323/223 |
| 4,220,926 A | * | 9/1980 | Buckner | H03G 3/345 327/552 |
| 5,408,193 A | * | 4/1995 | Rodal | H02M 1/14 327/559 |
| 6,489,755 B1 | * | 12/2002 | Boudreaux, Jr. | H02M 1/15 323/282 |
| 7,944,273 B1 | * | 5/2011 | Vinciarelli | H02M 1/32 327/531 |

(Continued)

FOREIGN PATENT DOCUMENTS

| JP | S61214771 A | * | 9/1986 | H02M 1/14 |
| JP | H07303030 A | * | 11/1995 | H01L 21/66 |
| JP | 2001085996 A | * | 3/2001 | H03L 7/10 |

*Primary Examiner* — Timothy J Dole
*Assistant Examiner* — Ivan Laboy Andino (57) ABSTRACT

To provide a power supply noise reduction circuit and a power supply noise reduction method that do not require circuit elements to be increased in size and do not cause voltage drop in a power supply voltage. A power supply noise reduction circuit 10 that reduces noise included in a constant voltage output that is output from a power supply 2 to a load includes a first resistor 20 that is inserted into a power supply line L1 extending from the power supply 2 to the load, a filter 31 that is coupled to a load terminal of the first resistor 20 and outputs a first voltage that is obtained by reducing the noise from the constant voltage output, and a unity gain amplifier 32 that drives the first voltage output from the filter 31 and outputs the driven first voltage to the load terminal of the first resistor 20.

7 Claims, 3 Drawing Sheets

(56) References Cited

U.S. PATENT DOCUMENTS

2004/0021507 A1* 2/2004 Fischer ............... H03L 7/18
327/558
2006/0092675 A1* 5/2006 Kajita ............. H01L 23/5286
363/39

* cited by examiner

POWER SUPPLY NOISE REDUCTION CIRCUIT AND POWER SUPPLY NOISE REDUCTION METHOD

TECHNICAL FIELD

The present invention relates to a power supply noise reduction circuit and a power supply noise reduction method for reducing noise included in a constant voltage output that is output from a power supply to a load.

BACKGROUND ART

When a semiconductor device is tested by a semiconductor tester, the test is conducted by driving the semiconductor device with electric power from a power supply. When noise (noise components) is included in a constant voltage output from the power supply, it is difficult to accurately conduct the test. Accordingly, power supply noise reduction circuits for reducing noise included in a constant voltage output that is output from a power supply to a semiconductor device have been conventionally used in practice. These power supply noise reduction circuits are broadly divided into a passive low-pass filter that is formed only by passive components and an active low-pass filter that uses active components.

A passive filter is generally a combination of a bypass capacitor and a choke coil. The bypass capacitor is configured to include a capacitor (an AC shunt circuit) connected in parallel to a load and keeps an impedance of the capacitor no a noise signal at a low level to cause the capacitor to bypass a noise current, thereby suppressing a flow of noise into the load. Meanwhile, the choke coil is inserted in series to a power supply line extending from a constant voltage source to the load to prevent a passage of a noise current and further divides a noise voltage according to a ratio between a series impedance of the power supply line and a shunt impedance of the bypass capacitor to increase an impedance ratio, thereby enhancing a noise suppression effect to suppress noise application to the load.

While a filter circuit using an operational amplifier or the like is generally applied as an active filter for a constant voltage source, a constant-voltage stabilization circuit normally functions as a filter in a constant-voltage power supply circuit that handles a large amount of electric power. Furthermore, a filter circuit that is inserted into an electrical supply line outside a power supply device is generally a so-called dropper-type simple constant-voltage power supply circuit designed for DC voltage stabilization including voltage conversion accompanied by voltage drop and ripple removal, such as a three-terminal regulator or a shunt regulator, and can reduce noise as a second-order effect of the constant voltage stabilization accompanied by voltage drop.

SUMMARY OF THE INVENTION

Problem to be Solved by the Invention

However, the conventional passive low-pass filter and active low-pass filter have the following problems.

As for the passive low-pass filter, when noise has a low frequency such as a frequency equal to or lower than an audio frequency band or when a noise source has a low impedance, it is necessary to greatly increase a capacitance value of the bypass capacitor or greatly increase an inductance value of the choke coil, which results in the power supply noise reduction circuit having a large size. Accordingly, mounting design limitations often complicate practical application of the power supply noise reduction circuit or restrict devices to which the power supply noise reduction circuit is applicable.

As in the above case, when the capacitance value of the bypass capacitor is greatly increased, or the inductance value of the choke coil is greatly increased, there is a problem that a time constant according to a combination of these elements is increased and thus a response time of the power supply noise reduction circuit becomes very long, which increases a rise time and a fall time of the power supply voltage. Particularly when a device that needs to test a semiconductor device in a very short time, such as a semiconductor tester, is required to supply constant voltage power with low noise to the semiconductor device to be tested, it is necessary to frequently perform application and stoppage of the power supply voltage or provide stepped changes in the power supply voltage during testing of one semiconductor device. Therefore, there is a problem that the increase in the rise time and the fall time of the power supply voltage directly leads to an increase in the entire testing time.

Furthermore, when the capacitance value of the bypass capacitor is greatly increased or the inductance value of the choke coil is greatly increased, phase rotation is increased from a relatively low frequency band so that the circuit is likely to oscillate at the time of rise or fall of the power supply voltage, or an electrically adverse influence on the power supply, the load, and the entire supply path (such as increase in an inrush current) is caused because the amount of change in a passing current of the capacitor or the choke coil in a transition time is large. Therefore, there is a problem that there are many negative effects such as requirement of additional design measures against the adverse influence.

Further, when the choke coil is used, an inductive reactance becomes smaller as the noise frequency is lower, which reduces the noise suppression effect of the filter. When a resistor that has an impedance not depending on the frequency is inserted in series with a coil, the suppression effect in a low frequency area can be improved. However, new problems such as occurrence of voltage drop with respect to the power supply voltage, and electric power loss and heat generation due to the resistor occur. Accordingly, there is a problem that it is difficult to use a high resistance value to increase the amount of improvement in low frequency noise and a sufficiently high noise reduction effect cannot be obtained after all.

Meanwhile, in an active circuit such as the three-terminal regulator or the shunt regulator, the power supply voltage is stabilized with voltage drop, thereby collaterally reducing the noise. Therefore, only the voltage at a fixed value that is previously defined at the time of circuit design (a value lower than the power supply voltage) can be supplied to the load and thus the voltage supplied from the power supply cannot be supplied, as it is to the load. Accordingly, for example, when an intended power supply voltage is to be supplied to the load through a power supply that can program a voltage value of the constant voltage output, there are problems such that the active circuit as mentioned above cannot be applied.

The present invention has been achieved in view of such conventional problems, and an object of the present invention is to provide a power supply noise reduction circuit and a power supply noise reduction method that do not require circuit elements to be increased in size and do not cause voltage drop in a power supply voltage.

Means for Solving Problem

To solve the above problems and achieve the above object, the invention according to claim 1 provides a power supply noise reduction circuit that reduces noise included in a constant voltage output that is output from a power supply to a load, the power supply noise reduction circuit comprising: a first resistor that is inserted into a power supply line extending from the power supply to the load; a low-pass filter that is coupled to a load terminal of the first resistor and outputs a first voltage that is obtained by reducing the noise from the constant voltage output; and a unity gain amplifier that drives the first voltage output from the low-pass filter and outputs the driven first voltage to the load terminal of the first resistor.

According to the invention of claim 2, in the invention according to claim 1, the low-pass filter includes a second resistor and a capacitor that are coupled in series.

According to the invention of claim 3, in the invention according to claim 2, a filter switching unit that switches a bypass line for bypassing the second resistor is provided.

According to the invention of claim 4, in the invention according to claim 2 or 3, a third resistor that decreases an input voltage to the unity gain amplifier through voltage division with the second resistor is provided.

According to the invention of claim 5, in the invention according to any one of claims 1 to 4, an amplifier switching unit that switches an output line extending from the unity gain amplifier to the load terminal of the first resistor on and off is provided.

The invention according to claim 6 provides a power supply noise reduction method that uses a power supply noise reduction circuit for reducing noise included in a constant voltage output that is output from a power supply to a load, thereby reducing the noise, the power supply noise reduction circuit comprising: a first resistor that is inserted into power supply line extending from the power supply to the load; a low-pass filter that is coupled to a load terminal of the first resistor and outputs a first voltage that is obtained reducing the noise from the constant voltage output, the low-pass filter including a second resistor and a capacitor that are coupled in series; a unity gain amplifier that drives the first voltage output from the low-pass filter and outputs the driven voltage to the load terminal of the first resistor; and a filter switching unit that switches a bypass line for bypassing the second resistor, the power supply noise reduction method comprising: a bypassing step of switching the bypass line to bypass the second resistor through the low-pass filter switching unit before the power supply is turned on a charging step of charging the capacitor by turning on the power supply after the bypassing step; and a connecting step of switching the bypass line to connect the second resistor through the filter switching unit after the charging step.

According to the invention of claim 7, in the invention according to claim 6, the power supply noise reduction circuit comprises an amplifier switching unit that switches an output line extending from the unity gain amplifier to the load terminal of the first resistor on and off, the output line is switched off by the amplifier switching unit in the bypassing step, and the output line is switched on by the amplifier switching unit in the connecting step.

Effect of the Invention

According to the invention of claim 1, the first voltage is driven through the unity gain amplifier, so that noise can be reduced without causing any voltage drop in the power supply voltage and that the voltage supplied from the power supply can be supplied to the load as it is. Therefore, the power supply noise reduction circuit can be applied also to a case where an intended power supply voltage is to be supplied to the load by using a power supply that can program a constant voltage output, for example. Because there is no need to use a large-capacity capacitor or a coil with a high inductance, adverse effects (such as increase in the size of part shapes of the power supply noise reduction circuit, increase in the testing time due to an increased time constant, and need for design measures against easier occurrence of oscillation or increase in the amount of current oscillation in a transition duration) due to usage of a large-capacity capacitor, a high-inductance coil, or a resistor with a high resistance or a high allowable loss in the conventional techniques can be eliminated.

According to the invention of claim 2, the low-pass filter includes the second resistor and the capacitor that are coupled in series. Therefore, the low-pass filter can be easily configured.

According to the invention of claim 3, the filter switching unit bypasses the second resistor, so that activation and stoppage of the power supply noise reduction circuit can be quickly and easily switched. Therefore, the power supply noise reduction circuit can be activated at an arbitrary time when power supply with low noise is required and the power supply noise reduction circuit can be stopped at an arbitrary time when power supply is not required.

According to the invention of claim 4, the third resistor that decreases the input voltage to the unity gain amplifier through voltage division with the second resistor is provided. Therefore, the constant voltage output of the power supply noise reduction circuit is slightly lower than the constant voltage output of the power supply, and thus supply of power from the unity gain amplifier to the load, is prevented. Accordingly, there is substantially no power load on the unity gain amplifier and it suffices to supply power for absorbing noise power.

According to the invention of claim 5, the output line of the unity gain amplifier is switched off by the amplifier switching unit at a rise time or a fall time of the constant-voltage power supply. Therefore, current occurrence due to a difference between the voltage of the constant-voltage power supply and the output voltage of the unity gain amplifier can be prevented.

According to the invention of claim 6, the second resistor is bypassed before the power supply is turned on and the second resistor is connected after the power supply is turned on and the capacitor is promptly charged. Therefore, the power supply noise reduction circuit enables completion of activation substantially simultaneously with power-on and thus the power supply noise reduction circuit can be activated at an arbitrary time when power supply with low noise is required and can be stopped at an arbitrary time when power supply is not required.

According to the invention of claim 7, driving of the power supply line through the unity gain amplifier is stopped before the power supply is turned on, and driving of the power supply line through the unity gain amplifier is started after the power supply is turned on to charge the capacitor, then the output voltage of the unity gain amplifier becomes equal to the output voltage of the power supply line, and activation of the power supply noise reduction circuit is completed. Therefore, the rise time and the fall time of the constant-voltage power supply, which are similar to those in a case where the power supply noise reduction circuit is non provided, can be realized without causing any electrical influence on the power supply line at the time of activation and stoppage of the power supply noise reduction circuit.

BRIEF DESCRIPTION OF THE DRAWINGS

FIG. 3(a) shows an analysis result in a case where the power supply noise reduction circuit is in an OFF state, FIG. 3(b) shows an analysis result in another case where the power supply noise reduction circuit is in an OFF state, and FIG. 3(c) shows an analysis result in a case where the power supply noise reduction circuit is in an ON state.

EMBODIMENT FOR CARRYING OUT THE INVENTION

An embodiment of the present invention is explained below in detail with reference to the accompanying drawings First, the basic concept of the embodiment is explained as [I], then specific contents of the embodiment are explained as [II], and lastly a modification of the embodiment is explained as [III]. The present invention is not limited to the embodiment.

[I] Basic Concept of the Embodiment

The basic concept of the present embodiment is explained first. A power supply noise reduction circuit and a power supply noise reduction method according to the present embodiment are for reducing noise included in a constant voltage output that is output from a power supply to a load. The power supply noise reduction circuit includes one that is configured independently from various devices and circuits such as a constant-voltage power supply device, and one that is incorporated in these devices and circuits. The latter corresponds to, for example, a case in which the power supply noise reduction circuit is incorporated in a constant-voltage power supply device to configure a low-noise constant-voltage power supply device as a whole. The power supply noise reduction circuit can be configured to operate in cooperation with other devices and, for example, a control of active elements included in the power supply noise reduction circuit can be executed by an external control device.

The power supply has an arbitrary specific configuration and includes a DPS (Device Power Supply), for example. The load also has an arbitrary specific configuration, and particularly a device that requires a low power-supply noise level (a semiconductor device for audio use, for example) corresponds thereto.

Hereinbelow, an explanation is given of a case where, when a semiconductor device is tested by a semiconductor tester, the power supply noise reduction circuit is provided in a power supply circuit that is incorporated in the semiconductor tester and in which active elements (specifically, a first relay and a second relay explained later) of the power supply noise reduction circuit are controlled by a control unit provided inside of the semiconductor tester.

[II] Specific Contents of the Embodiment

Specific contents of the present embodiment are explained below. A configuration of the power supply noise reduction circuit is explained first and a power supply noise reduction method performed using the power supply noise reduction circuit is explained next.

(Configuration)

Figure 1:
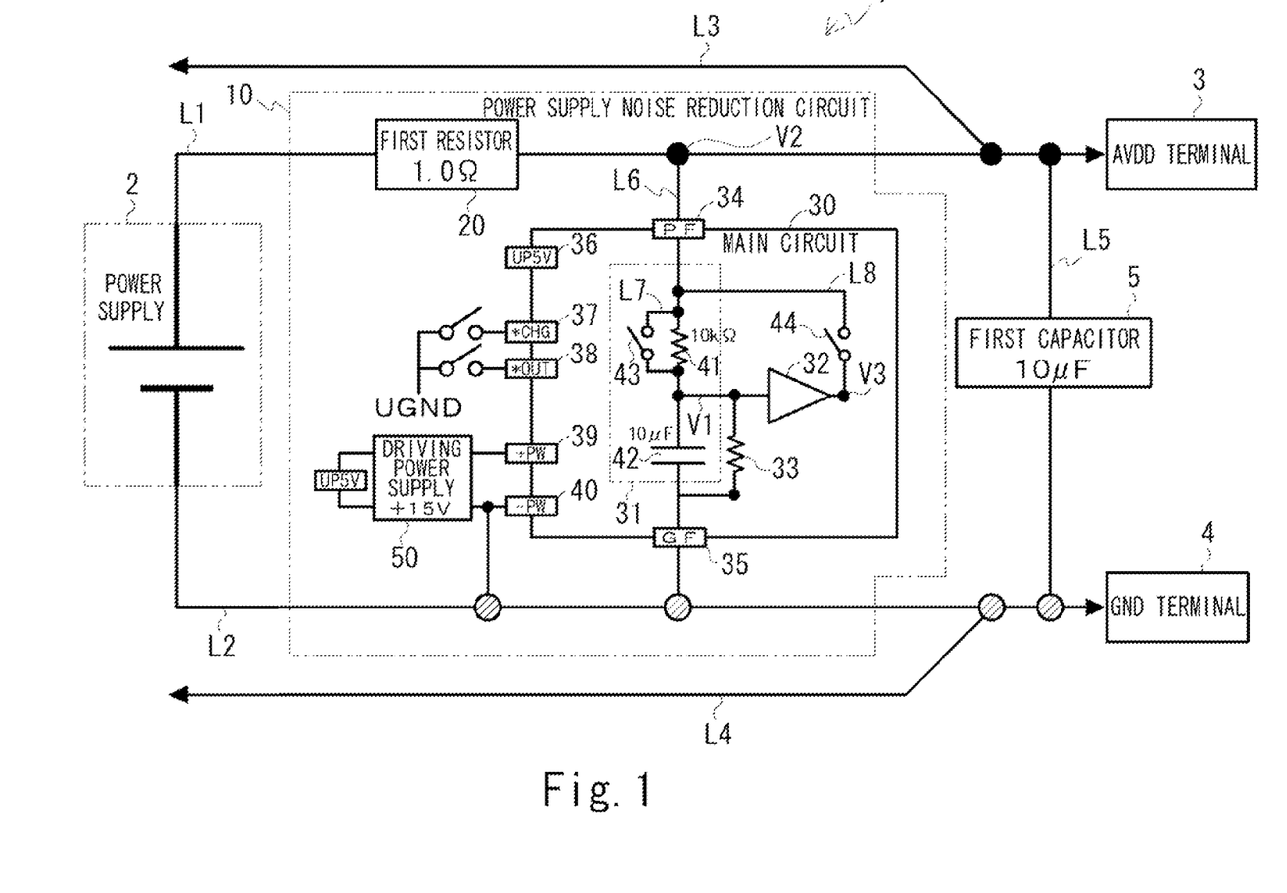
FIG. 1 is a block diagram of a constant-voltage stabilization circuit that includes a power supply noise reduction circuit according to an embodiment of the present invention.

FIG. 1 is a block diagram of a power supply circuit that includes the power supply noise reduction circuit according to the present embodiment. A power supply circuit 1 shown in FIG. 1 is configured to include a power supply 2, an output terminal (an AVDD terminal) 3, a GND terminal 4, a first capacitor 5, and a power supply noise reduction circuit (Active Noise Suppressor) 10. Although set values of circuit elements are shown in FIG. 1 for reference, these set values can be appropriately changed.

The power supply 2 is for supplying DC power to a load and is a DPS in this case. The positive terminal of the power supply 2 is coupled to the output terminal 3 via a power supply line L1 and electric power is supplied to the load via the output terminal 3. The negative terminal of the power supply 2 is coupled to the GND terminal 4 via a GND line 12. Monitor lines L3 and L4 are coupled to the power supply line L1 and the GND line L2, respectively, and the monitor lines L3 and L4 are coupled to the power supply 2 to feedback a monitor voltage supplied from the power supply 2 to the power supply 2 via the monitor lines L3 and L4, thereby executing a known feedback power supply control.

The first capacitor 5 is inserted into a line L5 that couples the power supply line L1 and the GND line L2 with each other and forms a series RC circuit together with a first resistor 20 (explained later), of the power supply noise reduction circuit 10. When the series RC circuit is provided in this way, high frequency noise components in the DC power supplied from the power supply 2 to the load are reduced by the series RC circuit to secure a minimum regulation of the DC power in a state where the power supply noise reduction circuit 10 is switched off.

The power supply noise reduction circuit 10 is for reducing noise supplied from the power supply 2 to the load and specifically is configured to include the first resistor 20, a main circuit 30, and a driving power supply 50.

The first resistor 20 is inserted into the power supply line L1, and forms the series RC circuit together with the first capacitor 5 in a state where the power supply noise reduction circuit 10 is switched off as mentioned above and reduces noise in cooperation with a low-pass filter 31 (explained later) in a state where the power supply noise reduction circuit 10 is switched on.

The main circuit 30 is inserted into a line L6 that coupled the power supply line L1 and the GND line L2 with each other and is configured to include the low-pass filter 31, a unity gain amplifier 32, and a third resistor 33. The main circuit 30 is modularized into one chip and includes a PF terminal 34, a GF terminal 35, a UP5V terminal 36, a CHG terminal 37, an OUT terminal 38, a +PW terminal 39, and a −PW terminal 40. In FIG. 1, a line connecting these terminals 34 to 40 is a visible outline of the main circuit 30 modularized into one chip.

The low-pass filter 31 is coupled to a load terminal of the first resistor 20 at a high impedance and outputs a first voltage obtained by reducing noise from the constant voltage output. Specifically, the low-pass filter 31 is configured to couple a second resistor 41 and a second capacitor 42 in series. In this case, values of the second resistor 41 and the second capacitor 42 are set to cause the low-pass filter 31 to have as large (long) a time constant as possible.

A bypass line L7 for bypassing the second resistor 41 is coupled to both ends of the second resistor 41 and a first relay (filter switching unit) 43 for switching the bypass line L7 between connection and non-connection is provided in the bypass line L7. The first relay 43 is driven according so a control signal that is input from the control unit provided inside of the semiconductor tester to the CHG terminal 37, and brings the second resistor 41 into a bypassed. (unused) state when the bypass line L7 is switched to connection (short-circuiting) while bringing the second resistor 41 into an un-bypassed (used) state when the bypass line L7 is switched to non-connection (disconnection). A driving power supply of the first relay 43 is supplied via the UP5V terminal 36.

The unity gain amplifier 32 drives a first voltage V1 output from the low-pass filter 31 at a low impedance and outputs the first voltage V1 to the load terminal of the first resistor 20. The unity gain amplifier 32 has an input terminal coupled between the second resistor 41 and the second capacitor 42 and an output terminal coupled to a load terminal of the second resistor 41 via an output line L8.

A second relay (amplifier switching unit) 44 is provided in the output line L8 to switch the output line L8 between connection and non-connection. The second relay 44 is driven according to a control signal that is input to the OUT terminal 38 from the control unit provided inside of the semiconductor tester. The output of the unity gain amplifier 32 is output to the load terminal of the second resistor 41 when the output line L8 is switched to connection (short-circuiting), and the output of the unity gain amplifier 32 to the load terminal of the second resistor 41 is stopped when the output line L8 is switched to non-connection (disconnection). A driving power supply of the second relay 44 is supplied via the UP5V terminal 36.

The third resistor 33 is inserted between the input terminal of the unity gain amplifier 32 and a ground terminal of the second capacitor 42. A reason why the third resistor 33 is provided in this way is as follows. That is, if the third resistor 33 is not provided, a voltage (hereinafter, second voltage) V2 of the load terminal of the first resistor 20 and a constant voltage output (hereinafter, third voltage) V3 of the unity gain amplifier 32 are substantially equal to each other. When the unity gain amplifier 32 is driven at a very low impedance, electric power is supplied to the load from the unity gain amplifier 32 located closer to the load than the power supply 2. However, the unity gain amplifier 32 does not have enough power to keep supplying the electric power to the load and thus causes a problem. Accordingly, the third resistor 33 is provided to slightly lower the first voltage V1 to be input to the unity gain amplifier 32 through voltage division with the second resistor 41, thereby driving the unity gain amplifier 32 with a lower input, voltage. However, if the third resistor is smaller than necessary, the noise reduction performance of the low-pass filter 31 is deteriorated and also the first voltage V1 is lowered in proportion to the third resistor 33. As a result, the output voltage of the unity gain amplifier 32 is decreased more and thus a large DC current in the negative direction (a sink direction) flows in the unity gain amplifier 32. Therefore, it is desirable to use as large a resistor as possible for the third resistor 33.

The driving power supply 50 is a power supply for driving the unity gain amplifier 32 and an insulated DC-DC converter is used therefor in this case. DC power converted by the driving power supply 50 into a predetermined voltage is input from the +PW terminal 39 and the −PW terminal 40 to the main circuit 30 and is supplied to the unity gain amplifier 32 via a line (not shown) in the main circuit 30.

(Power Supply Noise Reduction Method)

A power supply noise reduction method is explained next. In this case, the active elements of the power supply noise reduction circuit 10 are controlled at the time of power start-up when the power supply 2 is switched from off to on, and then a final state of the control is kept until the power supply 2 is switched off again. The active elements of the power supply noise reduction circuit 10 are then similarly controlled each time the power supply 2 is switched from off to on. This control is previously programmed as a power supply noise reduction process and, the control unit (not shown) provided, inside of the semiconductor tester executes this program, thereby switching the power supply 2 on and off and outputting the control signal to the CHG terminal 37 and the OUT terminal 38.

Figure 2:
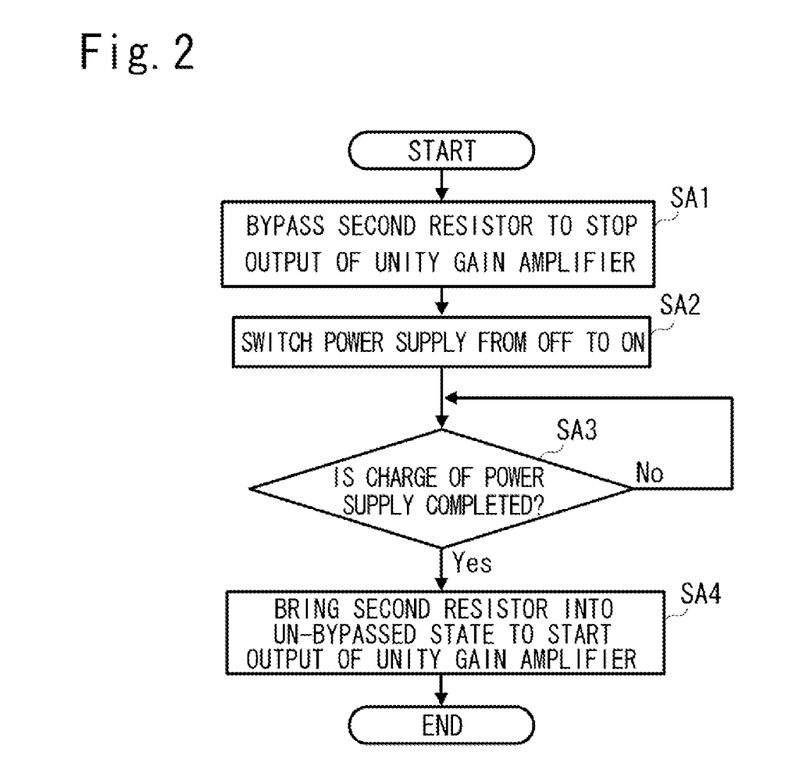
FIG. 2 is a flowchart of a power supply noise reduction process.

FIG. 2 is a flowchart of the power supply noise reduction process. Step is hereinafter abbreviated as "S". The control unit first controls the first relay 43 to connect the bypass line L7 to bring the second resistor 41 into the bypassed state and also controls the second relay 44 to bring the output line 1L8 into a non-connected state (SA1) and then switches the power supply 2 from off to on in this state (SA2). A part of the power supply current supplied from the power supply 2 then flows into the first capacitor 5 and the second capacitor 42 at the same time, and the first capacitor 5 and the second capacitor 42 are charged.

The control unit then waits for a passage of a rise time of the power supply 2 (a charge complete time of the first capacitor 5). Because the second resistor 41 is bypassed at that time, it is possible to cause the time constant of the low-pass filter 31 to be substantially zero and accordingly charge of the second capacitor 42 is completed simultaneously with completion of rise of the power supply 2 (completion of charge of the first capacitor 5). That is, the activation time of the power supply noise reduction circuit 10 is the same as the rise time of the power supply 2. The rise time of the power supply 2 can be previously defined according to a rise characteristic specific to the power supply or a program of the rise time. When there is no limitation on the rise time of the power supply 2, bypassing of the second resistor 41 is not required and can be omitted. In this case, the process can proceed to SA4 (explained later), in wait for completion of charge of the second capacitor 42. However, the time constant according to the second resistor 41 and the second capacitor 42 needs to be very long in this case and thus the rise time is increased.

After the rise of the power supply 2 is completed (SA3, Yes), the control unit controls the first relay 43 to switch the bypass line L7 to non-connection to bring the second resistor 41 into the un-bypassed state and also controls the second relay 44 to bring the output line L8 into the connected state, thereby outputting the output of the unity gain amplifier 32 to the load terminal of the second resistor 41 (SA4). A part of the power supply voltage supplied from the power supply 2 is then applied to the low-pass filter 31, noise is reduced by the filter 31, and the first voltage V1 (an average voltage, more precisely a voltage divided by the third resistor 33 to be slightly lower than the average voltage) is drawn and input to the input terminal of the unity gain amplifier 32.

In this state, the unity gain amplifier 32 drives the first voltage V1 input to the input terminal. Because the input terminal of the unity gain amplifier 32 is at a high impedance in this case, substantially no current flows through the unity gain amplifier 32. By driving the voltage obtained by reducing noise in the low-pass filter 31 through the unity gain amplifier 32 in this way, the voltage at the load terminal of the first resistor 20 and on the power supply line of the AVDD terminal 3 is forcibly caused to have the same value as that of the DC voltage from which noise has been reduced and is driven by the unity gain amplifier 32, and a noise voltage on the power supply line extending from the first resistor 20 to the AVDD terminal 3, continuously occurring due to the noise voltage output from the power supply 2, is absorbed and consumed by the unity gain amplifier 32 as a noise current. Furthermore, because the output voltage V3 from the unity gain amplifier 32 is slightly lower than the set voltage of the power supply 2, the second voltage V2 decreases to V1, then is fed back to the power supply 2 via the monitor line L4, is returned to the originally programmed voltage according no known feedback correction, converges, and stabilizes.

(Test Results)

Figure 3:
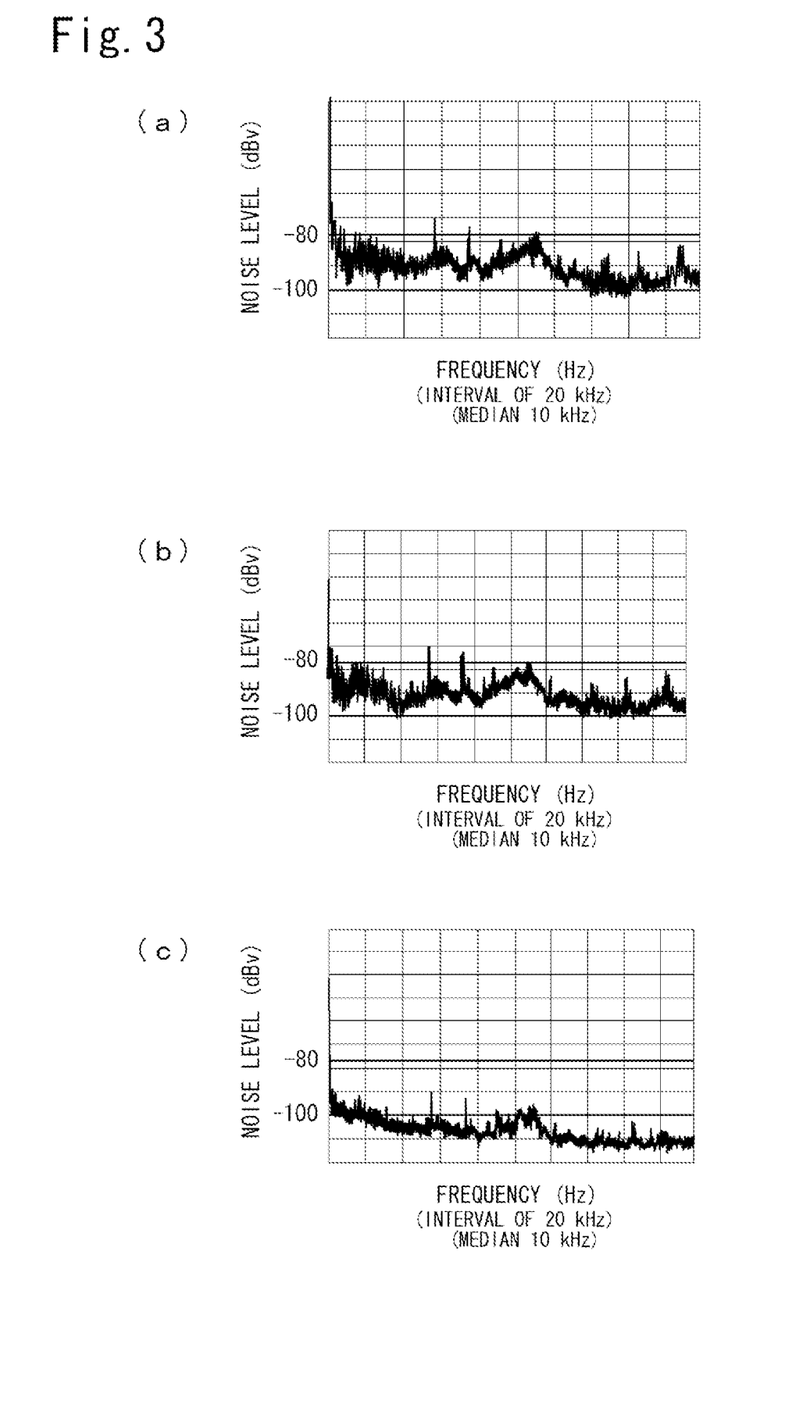
FIG. 3 are graphs showing results of an analysis of noise from an output terminal using a spectrum analyzer, where

Lastly, results of a performance test of the power supply noise reduction circuit 10 are explained. FIG. 3 are graphs showing results of an analysis of noise from the output terminal 3 using a spectrum analyzer. FIG. 3(*a*) shows an analysis result in a case where the power supply noise reduction circuit 10 is in an OFF state (the first resistor 20=1.0Ω and the first capacitor 5=10 μF (15.9 kHz)) in the circuit shown in FIG. 1, FIG. 3(*b*) shows an analysis result in a case where the power supply noise reduction circuit 10 is in an OFF state (the first resistor 20=1.0Ω and the first capacitor 5=100 μm (1.6 kHz)) in the circuit shown in FIG. 1, and FIG. 3(*c*) shows an analysis result in a case where the power supply noise reduction circuit 10 is in an ON state in the circuit shown in FIG. 1. In FIGS. 3(*a*) to 3(*c*), the horizontal axis represents the frequency (Hz) and the vertical axis represents the noise level (dBv).

As can be seen from FIGS. 3(*a*) and 3(*b*), in the case where the power supply noise reduction circuit 10 in the OFF state, while a certain level of a noise reduction effect is obtained because of the RC series circuit (a passive low-pass filter) of the first resistor 20 and the first capacitor 5, the noise level is at about −80 dBv and still high. On the other hand, as can be seen from FIG. 3(*c*), when the power supply noise reduction circuit 10 is in the ON state, the peak of the noise level is greatly reduced to about −100 dBv (10 μV). These results confirmed that the power supply noise reduction circuit 10 according to the present embodiment has a higher noise reduction effect than the conventional passive filter.

[III] Modification of the Embodiment

While the embodiment of the present invention has been explained above, the specific configuration and units of the present invention can be arbitrarily modified or improved without departing from the technical concept of respective inventions as defined in the appended claims. Such a modification is explained below.

Problem to be Solved and Effect of the Invention

The problem to be solved by the invention and the effect of the invention are not limited to those described above. Problems that are not described above can be solved by the present invention, and effects that are not described above can be achieved by the present invention. Furthermore, only a part of the problem described above may be solved or only a part of the effect described above may be achieved by the present invention.

(Specific Circuit Configuration)

The circuit can have various specific configurations other than that shown in FIG. 1 by changing the configuration within the scope of well-known techniques. For example, it suffices that the low-pass filter 31 is connected to the load terminal of the first resistor 20 and outputs the first voltage that is obtained by reducing noise from the constant voltage output, and a filter having desired characteristics other than the filter 31 shown in FIG. 1 can be adopted. For example, when there is no need to consider a regulation in the case where the power supply noise reduction circuit 10 is turned off, the first capacitor 5 can be omitted. The first resistor 20 can be formed integrally with the main circuit 30 on one chip. The low-pass filter 31 and the unity gain amplifier 32 can be formed integrally into an amplifier having desired triter characteristics.

(Number of Main Circuits or Filters to be Included)

While only one filter 31, one unity gain amplifier 32, and one third resistor 33 are provided inside of the main circuit 30 in the embodiment mentioned above, several combinations of the filter 31, the unity gain amplifier 32, and the third resistor 33 (in practice, also the PF terminal 34 and the GF terminal 35) can be provided to configure the power supply noise reduction circuit 10 for a plurality of power supplies.

(Control Unit)

While it has been explained that the power supply noise reduction circuit 10 is controlled by the control unit provided inside of the semiconductor tester in she above embodiment, the control unit can be incorporated in a power supply circuit.

EXPLANATIONS OF REFERENCE CHARACTERS

1 power supply circuit
2 power supply
3 output terminal
4 GND terminal
5 first capacitor
10 power supply noise reduction circuit
20 first resistor
30 main circuit
31 low-pass filter
32 unity gain amplifier
33 third resistor
34 PF terminal
35 OF terminal
36 UP5V terminal
37 CHG terminal
38 OUT terminal
39 +PW terminal
40 −PW terminal
41 second resistor
42 second capacitor
43 first relay
44 second relay
50 driving power supply
L1 Power supply line
L2 GND line
L3, L4 monitor line
L5, L6 line
L7 bypass line
V1 output line
V2 second voltage
V3 third voltage

The invention claimed is:

1. A power supply noise reduction circuit that reduces noise included in a constant voltage output that is output from a power supply to a load, the power supply noise reduction circuit comprising:

a first resistor that is inserted into a power supply line extending from the power supply to the load;

a low-pass filter that is connected to a load terminal of the first resistor and outputs a first voltage that is obtained by reducing the noise from the constant voltage output, the low-pass filter including a second resistor and a capacitor that are connected in series and also including a bypass line for bypassing the second resistor; and a unity gain amplifier that drives the first voltage output from the low-pass filter and outputs the driven first voltage to the load terminal of the first resistor, wherein the low-pass filter is configured to connect the bypass line and bypass the second resistor through a low-pass filter switching unit before the power supply is turned on, wherein the capacitor is charged by turning on the power supply after the bypass line is switched to bypass the second resistor, and wherein after the power supply is turned on and the capacitor is charged the low-pass filter is configured to switch the bypass line to un-bypass the second resistor.

2. The power supply noise reduction circuit according to claim 1, comprising the filter switching unit that switches the bypass line for bypassing the second resistor before the power supply is turned on.

3. The power supply noise reduction circuit according to claim 1, comprising a third resistor that decreases an input voltage to the unity gain amplifier through voltage division with the second resistor.

4. The power supply noise reduction circuit according to claim 1, comprising an amplifier switching unit that switches an output line extending from the unity gain amplifier to a load terminal of the second first resistor on and off.

5. The power supply noise reduction circuit according to claim 3, wherein the third resistor is coupled between an input terminal of the unity gain amplifier and a ground terminal of the capacitor.

6. A method of power supply noise reduction for reducing noise included in a constant voltage output that is output from a power supply to a load using a power supply noise reduction circuit, wherein the power supply noise reduction circuit comprises:

a first resistor that is inserted into a power supply line extending from the power supply to the load;

a low-pass filter that is connected to a load terminal of the first resistor and outputs a first voltage that is obtained by reducing the noise from the constant voltage output, the low-pass filter including a second resistor and a capacitor that are connected in series;

a unity gain amplifier that drives the first voltage output from the low-pass filter and outputs the driven voltage to the load terminal of the first resistor; and a filter switching unit that switches a bypass line for bypassing the second resistor, wherein the method comprises:

a bypassing step of switching the bypass line to bypass the second resistor through the low-pass filter switching unit before the power supply is turned on;

a charging step of charging the capacitor by turning on the power supply after the bypassing step; and a connecting step of switching the bypass line to connect the second resistor through the filter switching unit after the charging step.

7. The method according to claim 6, wherein the power supply noise reduction circuit comprises an amplifier switching unit that switches an output line extending from the unity gain amplifier to the load terminal of the first resistor on and off;

the output line is switched off by the amplifier switching unit in the bypassing step; and the output line is switched on by the amplifier switching witching unit in the connecting step.

\* \* \* \* \*